United States Patent
Kogan (10) Patent No.: US 12,440,968 B2
(45) Date of Patent: Oct. 14, 2025

(54) CONTROL AND MONITORING OF A MACHINE ARRANGEMENT

(71) Applicant: KUKA Deutschland GmbH, Augsburg (DE)

(72) Inventor: Yevgen Kogan, Augsburg (DE)

(73) Assignee: KUKA Deutschland GmbH (DE)

( * ) Notice: Subject to any disclaimer, the term of this patent is extended or adjusted under 35 U.S.C. 154(b) by 500 days.

(21) Appl. No.: 17/776,419

(22) PCT Filed: Oct. 29, 2020

(86) PCT No.: PCT/EP2020/080442
§ 371 (c)(1),
(2) Date: May 12, 2022

(87) PCT Pub. No.: WO2021/094101
PCT Pub. Date: May 20, 2021

(65) Prior Publication Data
US 2022/0402121 A1    Dec. 22, 2022

(30) Foreign Application Priority Data
Nov. 12, 2019   (DE) ..................... 10 2019 217 427.2

(51) Int. Cl.
*B25J 9/16*      (2006.01)
*G06F 11/30*     (2006.01)

(52) U.S. Cl.
CPC ............ *B25J 9/161* (2013.01); *B25J 9/1674* (2013.01); *G05B 2219/2205* (2013.01);
(Continued)

(58) Field of Classification Search
CPC .. B25J 9/161; B25J 9/1674; B25J 9/16; G06F 11/3013; G06F 11/3024; G06F 11/3055;
(Continued)

(56) References Cited

U.S. PATENT DOCUMENTS 7,383,423 B1 *   6/2008  Hughes ............... G06F 15/8007
                                                            712/28
8,037,350 B1    10/2011  Aggarwal et al.
(Continued)

FOREIGN PATENT DOCUMENTS

CN    108023809 A       5/2018
CN    114930258 A  *    8/2022    ............ B25J 9/1674
(Continued)

OTHER PUBLICATIONS

English Translation for JP-2008015638-A (Year: 2008).*
(Continued)

*Primary Examiner* — Cuong H Nguyen
(74) *Attorney, Agent, or Firm* — Dorton & Willis, LLP (57) ABSTRACT

A method for controlling and/or monitoring a machine arrangement having at least one machine, in particular at least one robot, with the aid of a processor arrangement having a plurality of processors each with at least one core. The method includes selecting, in particular temporarily selecting, a first available and at least one further available core on the proviso that these cores are implemented, in particular arranged, on different processors of the processor arrangement, in particular during operation of the machine arrangement and/or on the basis of an updated directory and/or on the basis, in particular as a result, of an ascertained need for redundant processing of process signals; processing process signals redundantly with the aid of these selected cores; and controlling and/or monitoring the machine arrangement on the basis of this processing.

17 Claims, 2 Drawing Sheets

(52) U.S. Cl.
    CPC .............. *G05B 2219/33332* (2013.01); *G05B 2219/34482* (2013.01); *G06F 11/3055* (2013.01)

(58) Field of Classification Search
    CPC ...... G06F 11/1629; G05B 2219/33332; G05B 2219/2205; G05B 19/0428; G05B 2219/33333; G05B 2219/33334; G05B 2219/34482
    USPC ............................................. 721/1; 700/245
    See application file for complete search history.

(56) References Cited

U.S. PATENT DOCUMENTS

| | | | |
|---|---|---|---|
| 9,891,978 B1* | 2/2018 | Fejfar | G06F 11/0766 |
| 10,423,158 B1* | 9/2019 | Hadlich | G07C 5/0808 |
| 2006/0212677 A1* | 9/2006 | Fossum | G06F 9/5027 |
| | | | 712/1 |
| 2012/0036398 A1 | 2/2012 | Moyer et al. | |
| 2016/0216704 A1* | 7/2016 | Koh | G06F 11/0736 |
| 2018/0329397 A1* | 11/2018 | Izzo | G05B 19/0428 |
| 2019/0056719 A1 | 2/2019 | Ong et al. | |
| 2019/0155681 A1 | 5/2019 | Lee et al. | |
| 2020/0073370 A1 | 3/2020 | Izzo et al. | |
| 2020/0150635 A1 | 5/2020 | Grosch et al. | |
| 2023/0156531 A1* | 5/2023 | Miklós | H04W 36/0011 |
| | | | 370/331 |

FOREIGN PATENT DOCUMENTS

| | | | | |
|---|---|---|---|---|
| DE | 102018207399 A1 | | 11/2018 | |
| DE | 102018120345 A1 | | 2/2019 | |
| DE | 102019217427 A1 | * | 5/2021 | ............ B25J 9/1674 |
| EP | 33 16052 A1 | | 5/2018 | |
| EP | 3654121 A1 | | 5/2020 | |
| JP | 2008015638 A | * | 1/2008 | |
| KR | 20220027666 A | * | 3/2022 | ............... B25J 19/02 |
| KR | 20220101650 A | * | 7/2022 | ............ B25J 9/1674 |
| WO | WO-2021094101 A1 | * | 5/2021 | ............ B25J 9/1674 |

OTHER PUBLICATIONS

An English-translated version of Japanese patent: JP2008015638A (by Kenta Morishima—published date: Jan. 24, 2008) (Year: 2008).*
Basireddy, Karunakar Reddy. Runtime energy management of concurrent applications for multi-core platforms. Diss. University of Southampton, 2019. (Year: 2019).*
Ichnowski, Jeffrey. Scaling Robot Motion Planning to Multi-Core Processors and the Cloud. Diss. The University of North Carolina at Chapel Hill, 2019. (Year: 2019).*
Amarnath, Rakshith. Techniques for Memory Mapping on Multi-Core Automotive Embedded Systems. Diss. Master Thesis, Delft University of Technology, 2012.[Online]. Available: http://resolver.tudelft. nl/uuid: 7fe80a02-fcf6-4e88-ad99-4dd3cf7ada2d, 2020. (Year: 2020).*
Kim, Sung Il, and Jong-Kook Kim. "A method to construct task scheduling algorithms for heterogeneous multi-core systems." IEEE Access 7 (2019): 142640-142651. (Year: 2019).*
European Patent Office; Search Report in related International Patent Application No. PCT/EP2020/080442 dated Feb. 9, 2021; 3 pages.
German Patent Office; Office Action in related German Patent Application No. 10 2019 217 427.2 dated Jul. 16, 2020; 7 pages.
Ulbrich, W.: Verlässliche Echtzeitsysteme. Lehrstuhl für Verteilte Systeme und Betriebssysteme, Friedrich Alexander-Universität Erlangen-Nürnberg; Apr. 28, 2016.
Chen, C.-I. H. u.a.: Task allocation and reallocation for fault tolerance in multicomputer systems. In IEEE Transactions an Aerospace and Electronic Systems, vol. 30, N. 4, Oct. 1994, S. 1094-1104.
Chinese Patent Office; Office Action in related Chinese Patent Application No. 2020800927228 dated Mar. 5, 2025; 8 pages.
European Patent Office; Examination Report in related European Patent Application No. 20 800 111.5 dated Nov. 4, 2024; 12 pages.

* cited by examiner

Fig. 1

Fig. 2

CONTROL AND MONITORING OF A MACHINE ARRANGEMENT

CROSS-REFERENCE TO RELATED APPLICATIONS

This application is a national phase application under 35 U.S.C. § 371 of International Patent Application No. PCT/EP2020/080442, filed Oct. 29, 2020 (pending), which claims the benefit of priority to German Patent Application No. DE 10 2019 217 427.2, filed Nov. 12, 2019, the disclosures of which are incorporated by reference herein in their entirety.

TECHNICAL FIELD

The present invention relates to a method and to a system for controlling and/or monitoring a machine arrangement comprising at least one machine, in particular at least one robot, with the aid of a processor arrangement having a plurality of processors each with at least one core, and to a computer program product for carrying out the method.

BACKGROUND

Because machines, in particular robots, are redundantly controlled and/or monitored by a plurality of (processor) cores, safety can advantageously be increased.

SUMMARY

The object of the present invention is to improve the control and/or monitoring of a machine arrangement with at least one machine, in particular at least one robot.

This object is achieved by a method and a system or computer program product for carrying out a method described herein.

According to one embodiment of the present invention, a machine arrangement has one or more machines, in particular one or more robots, in particular industrial robots.

The present invention can be used with particular advantage in such machine or robot arrangements, in particular due to their complexity, speed, and/or working range.

According to one embodiment of the present invention, a processor arrangement has a plurality of processors, preferably spatially spaced apart from one another or physically different processors, in one embodiment a plurality of CPUs, which in turn each have one or more cores. Accordingly, a processor of the processor arrangement can in particular (each) have at least one CPU; in one embodiment, a processor of the processor arrangement can in particular (each) be at least one CPU.

In one refinement, a first (machine, in particular robot) controller with which at least one of the first machines, in particular at least one of the first robots, of the machine arrangement is controlled and/or monitored, or which is provided, in particular is configured or used, for this purpose, has one or more (first) processors of the processor arrangement, and a second (machine, in particular robot) controller with which at least one of the second machines, in particular at least one of the second robots, of the machine arrangement is controlled and/or monitored, or which is provided, in particular is configured or used, for this purpose, has one or more (second) processors of the processor arrangement. In one embodiment, a third (machine, in particular robot) controller with which at least one third machine of the machines, in particular at least one third robot of the robots, of the machine arrangement is controlled and/or monitored, or which is provided, in particular is configured or used, for this purpose, has one or more (third) processors of the processor arrangement.

Controlling can comprise, in particular, regulating and/or outputting a signal, in particular an error or monitoring signal. In one embodiment, a (machine, in particular robot) controller controls and/or monitors the machine arrangement, in one embodiment one or more of the machines thereof, in particular robots, or is provided for this purpose, in particular is configured or used for this purpose. Accordingly, a (corresponding, in one embodiment pure or mere) monitoring (device), in particular safety monitoring (device) is generally referred to as (machine, in particular robot) controller within the meaning of the present invention.

According to one embodiment of the present invention, a method for controlling and/or monitoring the machine arrangement, in particular the or one or more of the machines, in particular the or one or more of the robots, with the aid of the processor arrangement, has in one embodiment the following consecutive steps and/or steps that are repeated one or more times, of:

(a) selecting, in particular temporarily selecting,
  a first core that is in particular currently available (for controlling or monitoring the machine arrangement) and
  at least one further core of the processor arrangement that is in particular currently available (for controlling or monitoring the machine arrangement),
  on the proviso that these cores are implemented, in particular arranged, on, in particular physically, different processors of the processor arrangement which are spatially spaced apart from one another in one embodiment,
  this selecting being carried out in one embodiment
    during operation of the machine arrangement and/or
    on the basis of an updated directory and/or
    on the basis, in particular as a result, of an ascertained, in particular current or predicted, need for redundant processing of process signals;
(b) processing process signals redundantly with the aid of these selected cores; and
(c) controlling and/or monitoring the machine arrangement, in particular at least one first machine, in particular at least one first robot, of the machine arrangement on the basis of this processing, in particular on the basis of these (redundantly) processed process signals.

By selecting the cores which process signals redundantly for controlling or monitoring the machine arrangement on the proviso that these cores are implemented, in particular arranged, on, in particular physically, different processors of the processor arrangement which are spatially spaced apart from one another in one embodiment, safety can advantageously be increased.

By selecting cores that are (currently) available in each case temporarily or during operation of the machine arrangement or on the basis, in particular as a result, of an ascertained need, the processor arrangement can be used better in one embodiment or a more compact processor arrangement can be used and/or safety and/or a process speed of the machine arrangement can be further increased.

An ascertainment of a, in particular current or predicted, need for redundant processing of process signals can, in particular, comprise, in particular be, an ascertainment that there is (any) current need for redundant processing of process signals or an ascertainment that there is (any) predicted need for redundant processing of process signals, or a forecast that (any) need for redundant processing of process signals will be present.

Additionally or alternatively, ascertaining a, in particular current or predicted, need for redundant processing of process signals in one embodiment can comprise determining a, in particular current or predicted, required quality of one or the redundant processing of process signals, in particular its or a(n) (ascertained) need for redundant processing of process signals, in particular, a required quality of one or of the redundant processing of process signals.

In one embodiment, in step (a), a first and at least one further available core are selected which have the same (type of) architecture if a first, (low(er)) required quality of redundant processing of process signals is ascertained, and a first and at least one further available core are selected, which cores have different architectures if a second, higher required quality of redundant processing of process signals is ascertained.

Additionally or alternatively, in one embodiment in step (d), one of the other available cores different from the first core and at least one further available core different from the first core are selected which have the same (type of) architecture if a first, (low(er)) required quality of redundant processing of process signals is ascertained, and another and at least one further available core are selected, which cores have different architectures if a second, higher required quality of redundant processing of process signals is ascertained.

In this way, a required fail-safety can be implemented in one embodiment.

A (required) quality of redundant processing can comprise, in particular be, a PL level, SIL level, or the like.

In one embodiment, the method has the following steps, which in one embodiment are subsequent and/or consecutive and/or repeated one or more times, of:
(d) selecting, in particular temporarily selecting,
another core different from the first core that is in particular currently available (for controlling or monitoring the machine arrangement), and
at least one further core that is in particular currently available (for controlling or monitoring the machine arrangement) and is different from the first core,
in one embodiment of the or a further core selected in step (a) and/or at least one core different therefrom, on the proviso that these cores (selected in step (d)) are (for their part) implemented, in particular arranged, on, in particular physically, different processors of the processor arrangement which are spatially spaced apart from one another in one embodiment,
this selecting being carried out in one embodiment
on the basis of the updated directory and/or
while carrying out or upon completion of step (c)
on the basis, in particular as a result, of an ascertained, in particular current or predicted, need for redundant processing of process signals;
(e) processing process signals redundantly with the aid of these selected cores (in step (d)); and
(d) controlling and/or monitoring the machine arrangement, in particular the same machine, on the basis of this processing, (in step (e)), in particular on the basis of these (in step (e) redundantly) processed process signals.

By selecting the cores in step (d) while carrying out step (c), in one embodiment, a plurality of machines, in particular robots, of the machine arrangement can be controlled or monitored at least partially in parallel in terms of time.

By selecting the cores in step (d) after completion of step (c), in one embodiment the same machine, in particular the same robot, of the machine arrangement can be controlled or monitored one after the other with different core(s) (combination(s)).

As a result, the processor arrangement can be used better in one embodiment or a more compact processor arrangement can be used and/or safety and/or a process speed of the machine arrangement can be further increased.

A (temporary) selection in step (a) and/or (d) during operation of the machine arrangement comprises in one embodiment (in each case) a selection while the machine arrangement is (already) supplied with energy, in particular while the machine arrangement is (already) functioning, in particular is (already) moving. Thus, in one embodiment, the selection in step (a) and/or (d) takes place (only) when there is a(n) (ascertained) need and/or at runtime and/or variably, in one embodiment on the basis of a corresponding request or an intended or forthcoming controlling or regulating or monitoring.

In one embodiment, the selection in step (a) and/or (d) is initiated by or depending on a(n) (ascertained) need for redundant processing of process signals. Accordingly, in one embodiment, the method has the step of:
ascertaining a need for redundant processing of process signals, in particular by a (machine, in particular robot) controller with which the machine arrangement, in one embodiment at least one of the machines, in particular at least one of the robots, of the machine arrangement is controlled and/or monitored, or which is provided, in particular is configured or used, for this purpose;
step (a) and/or (d) being carried out upon or as a result of said ascertainment.

In one embodiment, the method has the following step, which is repeated one or more times in one refinement, of:
(I) classifying, in one embodiment marking, in particular highlighting, one or more currently unselected cores (suitable for controlling or monitoring the machine arrangement) as available (currently available and/or available for controlling or monitoring the machine arrangement).

In one embodiment, this/these core(s) that is/are currently unselected is/are marked as (currently) available in step (I) in a directory, in particular the (updated) directory, in one embodiment.

Additionally or alternatively, in one embodiment, one or more of the cores selected in step (a) is/are classified, in one embodiment highlighted, as (again) available in step (I) after the completion of step (c), in particular in one or the directory.

Additionally or alternatively, in one embodiment, one or more of the cores selected in step (d) is/are classified, in one embodiment highlighted, as (again) available in (possibly a further) step (I) after the completion of step (f), in particular in one or the directory.

Additionally or alternatively, in one embodiment, the method has the following step, which is repeated one or more times in one refinement, of:
(II) classifying, in one embodiment marking, in particular highlighting, a currently selected core as unavailable (currently unavailable and/or unavailable for controlling or monitoring the machine arrangement).

In one embodiment, this/these currently selected core(s) is/are marked as (currently) unavailable in step (II) in a directory, in particular the (updated) directory, in one embodiment.

Additionally or alternatively, in one embodiment, one or more of the cores selected in step (a) is/are classified, in one embodiment highlighted, as (temporarily) unavailable (or no longer available) in step (II) upon or after the completion of step (a), in particular in one or the directory.

Additionally or alternatively, in one embodiment, one or more of the cores selected in step (d) is/are classified, in one embodiment highlighted, as (temporarily) unavailable (or no longer available) in (if appropriate a further) step (II) upon or after the completion of step (d) in particular in one or the directory.

Additionally or alternatively, in one embodiment, the method has the following step, which is repeated one or more times in one refinement, of:

(III) classifying at least one core as available or unavailable on the basis of its utilization level specified in a, in particular in the, directory.

In one embodiment, a core is classified as available if its utilization level specified in the directory falls below a predetermined utilization level threshold and/or classified as unavailable if its utilization level specified in the directory does not fall below one or the predetermined utilization level threshold.

In one embodiment, the processors of the processor arrangement report their cores which are available (currently available for controlling or monitoring the machine arrangement); in one refinement, these are entered in the directory which is thereby updated.

In one embodiment, the directory can be used, in particular read and/or modified, for a plurality of (machine, in particular robot) controllers of a cell, factory-wide in one refinement.

As a result, in one embodiment, in particular in combination of two or more of the above-mentioned features, cores currently available for controlling or monitoring the machine arrangement are particularly advantageously selected in step (a) and/or (d).

In one embodiment, in step (a) and/or (d), cores are selected on the basis of a spatial position of their processors or of the corresponding processor on which they are implemented, in particular arranged, in one refinement, in step (a), on the basis of a spatial position of their processors or of the corresponding processor on which they are implemented, in particular arranged, relative to a machine controlled or monitored in step (c) or its (machine) controller and/or, in step (d), on the basis of a spatial position of their processors or of the corresponding processor on which they are implemented, in particular arranged, relative to a machine controlled or monitored in step (f) or its (machine) controller.

In one embodiment, in step (a), a core of a processor of a machine controller of a machine of the machine arrangement that is or is to be controlled or monitored in step (c) ("machine controlled or monitored in step (c)") is prioritized or preferred (selected) over at least one other core or a core of a processor not belonging to this machine controller.

Additionally or alternatively, in one embodiment, in step (a), a core of a processor of a controller of a machine of the machine arrangement which is arranged in the same cell as this machine controlled or monitored in step (c) is prioritized or preferred (selected) over at least one other core or a core of a processor not belonging to a controller of a machine arranged in the same cell.

Additionally or alternatively, in one embodiment, in step (a), a core of one of these machines controlled or monitored in step (c) and/or closer to this machine controller is prioritized or preferred (selected) over at least one other core or a core of one of the processors (lying) further away from the controlled or monitored machine or machine controller.

Additionally or alternatively, in one embodiment, in step (d), a core of a processor of a machine controller of a machine of the machine arrangement that is or is to be controlled or monitored in step (f) ("machine controlled or monitored in step (f)"), is prioritized or preferred (selected) over at least one other core or a core of a processor not belonging to this machine controller.

Additionally or alternatively, in one embodiment, in step (d), a core of a processor of a controller of a machine of the machine arrangement which is arranged in the same cell as this machine controlled or monitored in step (f) is prioritized or preferred (selected) over at least one other core or a core of a processor not belonging to a controller of a machine arranged in the same cell.

Additionally or alternatively, in one embodiment, in step (d), a core of one of these machines controlled or monitored in step (f) and/or closer to the machine controller (thereof) is prioritized or preferred (selected) over at least one other core or a core of one of the processors (lying) further away from the controlled or monitored machine or machine controller.

Additionally or alternatively, in one embodiment in step (a) and/or (c), cores on processors with different architectures are prioritized or preferred (selected).

As a result, particularly advantageous cores can be selected in one embodiment in step (a) and/or (d), in particular in a combination of two or more of the above-mentioned features, for controlling or monitoring the machine arrangement, in particular a communication and/or (failure) safety.

In one embodiment, selected cores communicate with one another, with one or more process signal sources, in particular one or more sensors, in one embodiment one or more distance, touch, position, speed, acceleration, force, and/or torque sensor(s), and/or with one or more (machine, in particular robot) controllers of the machine arrangement via one or more common data connections, in particular at least one bus.

As a result, in one embodiment, communication and/or (failure) safety can be (further) improved.

According to one embodiment of the present invention, a system, in particular in terms of hardware and/or software, in particular in terms of programming, is configured to carry out a method described herein and/or comprises:

means for selecting, in particular temporarily selecting, a first core that is in particular currently available (for controlling or monitoring the machine arrangement) and at least one further core of the processor arrangement that is in particular currently available (for controlling or monitoring the machine arrangement), on the proviso that these cores are implemented, in particular arranged, on, in particular physically, different processors of the processor arrangement which are spatially spaced apart from one another in one embodiment, in one embodiment during operation of the machine arrangement and/or on the basis of an updated directory and/or on the basis, in particular as a result, of an ascertained need for redundant processing of process signals;

means for processing process signals redundantly with the aid of these selected cores; and means for controlling and/or monitoring the machine arrangement, in particular at least one first machine, in particular at least one first robot, of the machine arrangement on the basis of this processing, in particular on the basis of (redundantly) processed process signals.

In one embodiment, the system or the means thereof has:
means for selecting, in particular temporarily selecting, another available core different from the first core and at least one further available core different from the first core, on the proviso that these cores are implemented, in particular arranged, on different processors of the processor arrangement, in particular on the basis of the updated directory and/or when carrying out or after completion of step (c) and/or on the basis, in particular as a result, of an ascertained need for redundant processing of process signals;
means for processing process signals redundantly with the aid of these selected cores; and
means for controlling and/or monitoring the machine arrangement, in particular the same machine, on the basis of this processing.

Additionally or alternatively, in one embodiment, the system or the means thereof has:
means for classifying, in particular marking, at least one currently unselected core as available, in particular in a, in particular the, directory; and/or at least one of the cores selected in step (a) after the completion of step (c) and/or at least one of the cores selected in step (d) upon completion of step (f); and/or
means for classifying, in particular marking, at least one currently selected core as unavailable, in particular in a, in particular the, directory; and/or
means for classifying at least one core as available or unavailable on the basis of its utilization level specified in a, in particular in the, directory; and/or
means for repeating steps (a) to (c), (d) to (e), (I) and/or (II); and/or
means for selecting cores in step (a) and/or (d) on the basis of a spatial position of their processors; and/or
means for prioritizing, in step (a),
a core of a processor of a machine controller of a machine of the machine arrangement controlled or monitored in step (c), and/or
a core of a processor of a controller of a machine of the machine arrangement arranged in the same cell as the controlled or monitored machine, and/or
a core of a processor closer to this controlled or monitored machine and/or machine controller
relative to at least one other core; and/or
means for prioritizing, in step (d),
a core of a processor of a machine controller of a machine of the machine arrangement controlled or monitored in step (f), and/or
a core of a processor of a controller of a machine of the machine arrangement arranged in the same cell as the controlled or monitored machine, and/or
a core of a processor closer to this controlled or monitored machine and/or machine controller
relative to at least one other core; and/or
means for a prioritized or preferred selection of cores on processors with different architectures in step(s) (a) and/or (c).

Additionally or alternatively, the system or the means thereof in one embodiment has at least one common data connection, in particular a bus, via which selected cores communicate with one another, with at least one process signal source, and/or with at least one controller of the machine arrangement or which is provided, in particular is configured or used for this purpose.

A means within the meaning of the present invention may be designed in hardware and/or in software, and in particular may comprise a data-connected or signal-connected, in particular, digital, processing unit, in particular microprocessor unit (CPU), graphic card (GPU) having a memory and/or bus system or the like and/or one or a plurality of programs or program modules. The processing unit may be designed to process commands that are implemented as a program stored in a memory system, to detect input signals from a data bus and/or to output output signals to a data bus. A storage system may comprise one or a plurality of, in particular different, storage media, in particular optical, magnetic, solid-state, and/or other non-volatile media. The program may be designed in such a way that it embodies or is capable of carrying out the methods described herein, so that the processing unit is able to carry out the steps of such methods and thus, in particular, is able to control or monitor the machine arrangement. In one embodiment, a computer program product may comprise—and may in particular, be—a particularly non-volatile storage medium for storing a program, or having a program stored thereon, wherein an execution of this program causes a system or a controller, in particular a computer, to carry out the method described herein, or one or multiple steps thereof.

In one embodiment, one or more, in particular all, steps of the method are carried out completely or partially automatically, in particular by the system or the means thereof, in particular machine controllers.

In one embodiment, the system has the machine arrangement and/or processor arrangement.

In one embodiment, the controlling and/or monitoring of the machine arrangement in step (c) and/or (f) comprises, in particular is, a safe controlling or monitoring and/or the redundant processing of process signals in step (b) and/or (e) comprises, in particular is, one or more safety-related calculations and/or the process signals processed (redundantly) in step (b) and/or (e) comprise, in particular are, safety-related or safety-directed process signals.

In one embodiment, the or at least two of the cores selected in step (a) are implemented, in particular arranged, on different processors of the same computer, in particular
  on the same (machine, in particular robot) controller (to control or monitor) the same machine, in particular the same robot, the machine arrangement, and/or inside a computer housing.

Additionally or alternatively, in one embodiment, the or at least two of the cores selected in step (d) are implemented, in particular arranged, on different processors of the same computer, in particular
  the same (machine, in particular robot) controller (for controlling or monitoring) the same machine, in particular the same robot, the machine arrangement, and/or inside a computer housing.

As a result, in one embodiment, communication can be (further) improved, in particular implemented, (more) easily.

In one embodiment, the first core selected in step (a) is implemented, in particular arranged, on a processor of a computer, in particular
  a (machine, in particular robot) controller (for controlling or monitoring) a machine, in particular a robot, the machine arrangement, and/or
  inside a computer housing,
  and at least one further core selected in step (a) is implemented, in particular arranged, on a processor of a further computer, in particular a (machine, in particular robot) controller (for controlling or monitoring) a further machine, in particular another robot, the machine arrangement, and/or inside a further computer housing.

Additionally or alternatively, in one embodiment, the other core selected in step (d) is implemented, in particular arranged, on a processor of a computer, in particular a (machine, in particular robot) controller (for controlling or monitoring) a machine, in particular a robot, the machine arrangement, and/or inside a computer housing, and at least one further core selected in step (d) is implemented, in particular arranged, on a processor of a further computer, in particular a (machine, in particular robot) controller (for controlling or monitoring) a further machine, in particular a further robot, the machine arrangement, and/or inside a further computer housing.

As a result, (failure) safety can be (further) improved in one embodiment.

In one embodiment, redundant processing of process signals comprises diverse processing of the process signals.

As a result, safety can be (further) improved in one embodiment.

In one embodiment, a computer (each) contains one or more processors which in one embodiment are assigned (in particular connected) to a common infrastructure, in particular a common housing, a common main memory, and/or a common power supply. If processors are on different computers, the failure of one part of the infrastructure only affects the corresponding processor(s) in one embodiment.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

Further advantages and features will be appreciated from the following description.

DETAILED DESCRIPTION

Figure 1:
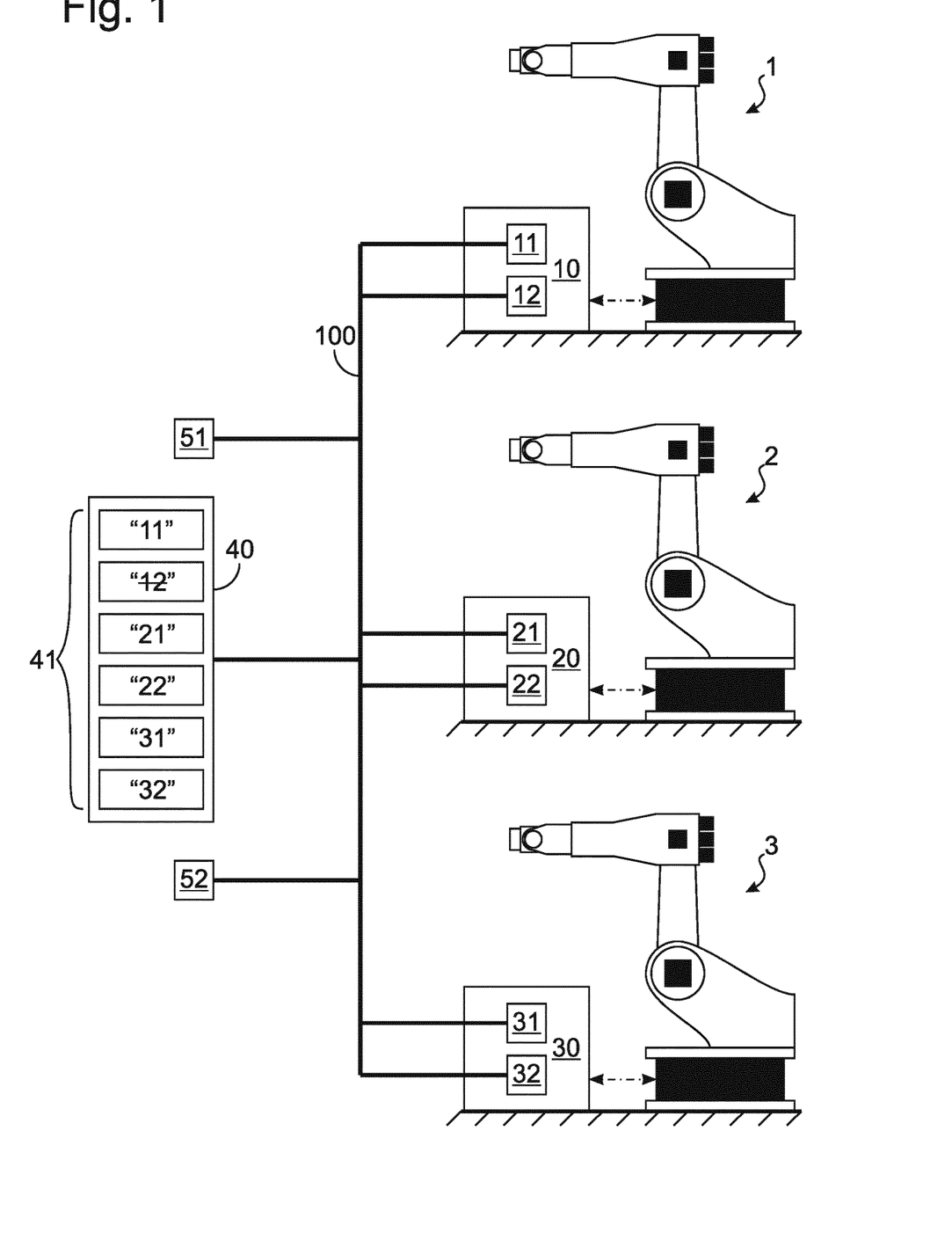
FIG. 1 schematically depicts an exemplary system for controlling and/or monitoring a machine arrangement according to one embodiment of the present invention.

FIG. 1 shows, by way of example, a machine arrangement having a first robot 1 which is controlled and/or monitored by a (robot) controller 10 which has a CPU with two cores 11, 12.

The machine arrangement has a second robot 2, which second robot is controlled and/or monitored by a (robot) controller 20 with a CPU having two cores 21, 22, and a third robot 3 which is controlled and/or monitored by a (robot) controller 30 with a CPU with two cores 31, 32.

The cores 11, 12, 21, 22, 31, 32 of the robot controllers 10, 20, 30 communicate via a bus 100 with one another and, in one embodiment, with additional sensors of which two sensors 51, 52 are indicated by way of example in FIG. 1, as well as a computer 40 in which a directory 41 is managed. In one embodiment, further sensors can be provided, in particular sensors on the robot, in particular via the robot controls 10, 20, 30, communicating with the bus 100, sensor 51 and/or 52 can be omitted, and/or the directory 41 on one of the robot controls 10, 20, 30 can be managed and/or may not communicate via the bus 100.

In a step S10 (cf. FIG. 2), the controllers 10, 20, 30 report their currently available cores for controlling or monitoring one of the robots 1, 2, 3 to the computer 40 which enters them in the directory 41, which is indicated in FIG. 1 by "11" etc.

Figure 2:
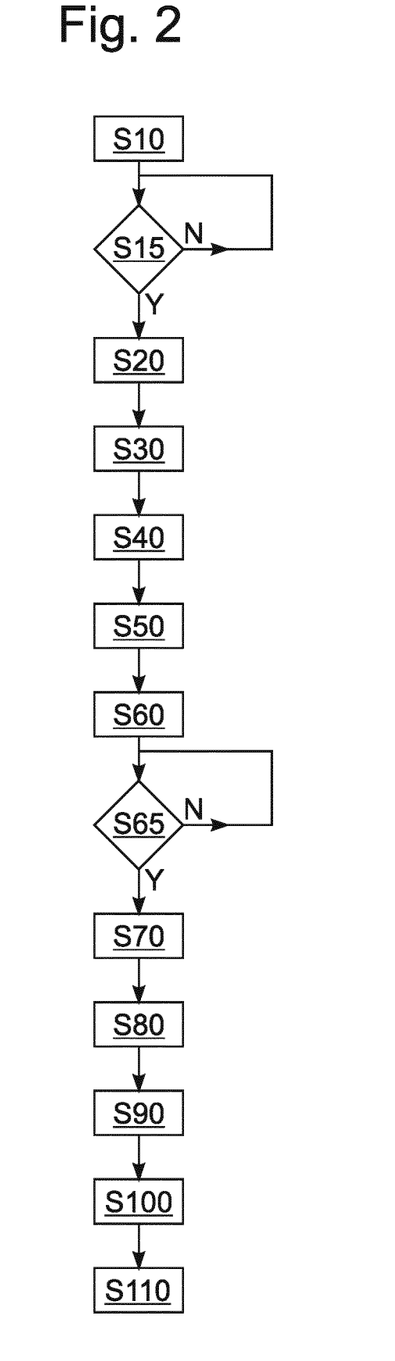
FIG. 2 depicts a method for controlling or monitoring the machine arrangement according to one embodiment of the present invention.

If one of the controllers 10, 20, 30 ascertains during operation that there is a need for safety-related calculations to safely control or monitor one of the robots 1, 2, 3 (S15: "Y"), in a step S20, it selects two cores from the cores currently available for this purpose using the directory 41, on the proviso that these are implemented, in particular arranged, on different processors. It prefers a currently available core of its own as a first core and a currently available core of a neighboring controller as a further core.

For example, if the core 12 is currently occupied, the controller 10 reports this as currently unavailable to the computer 40 which updates the directory 41 accordingly and marks this core 12 as currently unavailable, which is indicated by etc. in FIG. 1.

If the controller 10 ascertains during operation that there is a need for safety-related calculations for safely controlling or monitoring the robot 1, it first accordingly selects its own core 11 and then the core 21 of the neighboring controller 20 from the currently (still) available cores {11, 21, 22, 31, 32}.

Correspondingly, the computer 40 now also marks these cores 11, 21 in the directory 41 as currently unavailable (step S30).

In a step S40, the selected cores 11, 21 process signals redundantly, in particular carrying out safety-related calculations. On the basis of this processing or process signals or safety-related calculations, the controller 10 controls or monitors the robot 1 (step S50).

When this controlling or monitoring is complete, the controller 10 releases the two cores 11, 21 occupied by it and reports this to the computer 40 which updates the directory 41 accordingly and marks these cores 11, 21 as currently available (again) (step S60).

If the controller 10 again ascertains a need for safety-related calculations for safely controlling or monitoring of the robot 1, or if one of the controllers 20, 30 determines a need for safety-related calculations for safely controlling or monitoring the robot 2 or 3 (S65: "Y"), this controller selects analogously from the currently (still) available cores, if possible, first one of its own cores and then, if possible, one of the cores of a neighboring controller (step S70).

Correspondingly, the computer 40 marks these cores in the directory 41 as currently unavailable (step S80).

In a step S90, the selected cores process signals redundantly, in particular carrying out safety-related calculations. On the basis of this processing or process signals or safety-related calculations, the controller controls or monitors the corresponding robot (step S100).

The controller then releases the two cores occupied by it again and reports this to the computer 40 which updates the directory 41 accordingly and marks these cores as currently available (again) (step S110).

Although embodiments have been explained in the preceding description, it is noted that a large number of modifications are possible.

In particular, in one embodiment, one or more of the controllers 10, 20, 30 can each have at least two physically separate processors, on each of which at least one core is implemented, in particular arranged, i.e. in particular one of the two cores 11, 12 or 21, 22 or 31, 33. Then, the two cores of the two different processors of a controller can be selected in the same way.

Additionally or alternatively, in one embodiment, steps S65 to S110 can also be carried out partially in parallel with steps S15 to S60.

Additionally or alternatively, utilization levels of the cores can also be specified in the directory 41, or cores can be classified or selected as available or classified as unavailable on the basis of their utilization level, in particular classified as available if their utilization level falls below one or the predetermined utilization level threshold value and classified as unavailable if their utilization rate does not fall below a predetermined utilization rate threshold.

Additionally or alternatively, the ascertained need for safety-related calculations can comprise a required quality for safely controlling or monitoring one of the robots 1, 2, 3, in particular cores of the same (type of) (processor) architecture can be selected if a required quality falls below a predetermined quality threshold value, and cores with different (types of) (processor) architectures are selected if a required quality does not fall below one or the predetermined quality threshold value.

It is also noted that the embodiments are merely examples that are not intended to restrict the scope of protection, the applications, and the structure in any way. Rather, the preceding description provides a person skilled in the art with guidelines for implementing at least one embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SIGNS

1, 2, 3 Robot
10, 20, 30 Controller
11, 12, 21, 22, 31, 33 Core
40 Computer
41 Directory
51, 52 Sensor
100 Bus

What is claimed is:

1. A system for controlling and/or monitoring a machine arrangement that includes at least one machine with the aid of a processor arrangement having a plurality of processors, each with at least one core, the system comprising:
   means for classifying at least one core as available or unavailable on the basis of a utilization level of the at least one core specified in a directory;
   means for selecting a first available core and at least one second available core on the proviso that the first and second cores are implemented on different processors of the processor arrangement;
   means for processing first process signals redundantly with the aid of the selected first and second cores;
   means for controlling and/or monitoring the machine arrangement on the basis of the first process signals;
   (d) means for selecting a third available core different from the first core and at least one fourth available core different from the first core, on the proviso that the third available core and the at least one fourth available core are implemented on different processors of the processor arrangement;
   (e) means for processing second process signals redundantly with the aid of the third and fourth selected cores; and
   (f) means for controlling and/or monitoring the machine arrangement on the basis of the second process signals;
   wherein selecting is carried out on the basis of an updated directory.

2. The system of claim 1, wherein at least one of:
   the at least one machine is at least one robot;
   selecting the first and second cores comprises temporarily selecting the first and second cores;
   the first and second cores are arranged on different processors; or
   selecting is carried out at least one of:
      during operation of the machine arrangement,
      on the basis of an updated directory,
      on the basis of an ascertained need for redundant processing of process signals, or
      as a result of an ascertained need for redundant processing of process signals.

3. A method for controlling and/or monitoring a machine arrangement comprising at least one machine with the aid of a processor arrangement having a plurality of processors each with at least one core, the method comprising:
   classifying at least one core as available or unavailable on the basis of a utilization level of the at least one core specified in a directory;
   (a) selecting a first available core and at least one second available core on the proviso that the first and second cores are implemented on different processors of the processor arrangement;
   (b) processing first process signals redundantly with the aid of the selected first and second cores;
   (c) controlling and/or monitoring the machine arrangement on the basis of the first process signals;
   (d) selecting a third available core different from the first core and at least one fourth available core different from the first core, on the proviso that the third available core and the at least one fourth available core are implemented on different processors of the processor arrangement;
   (e) processing second process signals redundantly with the aid of the third and fourth selected cores; and
   (f) controlling and/or monitoring the machine arrangement on the basis of the second process signals;
   wherein selecting is carried out on the basis of an updated directory.

4. The method of claim 3, wherein at least one of:
   selecting the third and fourth cores comprises temporarily selecting the third and fourth cores;
   the third and fourth cores are arranged on different processors;
   selecting is carried out at least one of:
      during or after completion of step (c), on the basis of an ascertained need for redundant processing of process signals, or as a result of an ascertained need for redundant processing of process signals; or controlling and/or monitoring the machine arrangement on the basis of the second process signals comprises controlling and/or monitoring the same machine controlled and/or monitored on the basis of the first process signals.

5. The method of claim 3, further comprising at least one of the following steps:

(I) classifying at least one of:
at least one core that is currently unselected as available,
at least one of the cores selected in step (a) after the completion of step (c), or
at least one of the cores selected in step (d) upon completion of step (f); or (II) classifying at least one currently selected core as unavailable.

6. The method of claim 5, wherein at least one of:
cores are classified as available or unavailable in a directory;
classifying at least one core comprises marking the at least one core; or
classifying at least one core comprises classifying the at least one core in a directory.

7. The method of claim 3, further comprising repeating steps (a) to (c).

8. The method of claim 3, further comprising repeating at least one of:
steps (a) to (c); or
steps (d) to (e).

9. The method of claim 5, wherein at least one of:
steps a) to (c) are repeated;
steps (d) to (e) are repeated; or
at least one of steps (I), or (II) are repeated.

10. The method of claim 3, wherein selecting cores in at least one of steps (a) or (d) comprises selecting the cores on the basis of a spatial position of the respective processors.

11. The method of claim 3, wherein at least one of:
(I) in step (a), at least one of:
a core of a processor of a machine controller of a machine of the machine arrangement that is controlled or monitored in step (c),
a core of a processor of a controller of a machine of the machine arrangement arranged in the same cell as the controlled or monitored machine, or
a core of a processor located in close proximity to this controlled or monitored machine and/or machine controller compared to a core of a processor located further away,
is/are prioritized relative to at least one other core;
(II) in step (d), at least one of:
a core of a processor of a machine controller of a machine of the machine arrangement that is controlled or monitored in step (f),
a core of a processor of a controller of a machine of the machine arrangement arranged in the same cell as the controlled or monitored machine, or
a core of a processor located in close proximity to this controlled or monitored machine and/or machine controller compared to a core of a processor located further away,
is/are prioritized relative to at least one other core; or (III) in at least one of step (a) or step (d), selecting cores comprises selecting on the basis of the respective processor architecture.

12. The method of claim 11, wherein selecting cores on the basis of the respective processor architecture comprises selecting cores in a prioritized manner on processors with different architectures.

13. The method of claim 3, further comprising communicating, via at least one shared data connection, between at least one of:
at least one selected core with at least one other selected core;
at least one selected core with at least one process signal source, or
at least one selected core with at least one controller of the machine arrangement.

14. The method of claim 3, wherein at least one of:
cores selected in step (a) are implemented on different processors of the same computer, or the first core selected in step (a) is implemented on a processor of a computer and the at least one second core selected in step (a) is implemented on a processor of a different computer; or
cores selected in step (d) are implemented on different processors of the same computer, or the third core selected in step (d) is implemented on a processor of a computer and the at least one fourth core selected in step (d) is implemented on a processor of a different computer.

15. The method of claim 14, wherein:
cores implemented on different processors are arranged on different processors.

16. The method of claim 3, wherein at least one of:
the at least one machine is at least one robot;
selecting the first and second cores comprises temporarily selecting the first and second cores;
the first and second cores are arranged on different processors; or
selecting is carried out at least one of:
during operation of the machine arrangement,
on the basis of an ascertained need for redundant processing of process signals, or
as a result of an ascertained need for redundant processing of process signals.

17. A computer program code stored on a non-transitory, computer-readable medium, the program code, when executed on a computer, causing the computer to carry out a method according to claim 3.

* * * * *